US012710932B2

(12) United States Patent
Mainardi et al.

(10) Patent No.: US 12,710,932 B2
(45) Date of Patent: Aug. 18, 2026

(54) AI QUORUM FOR RESOURCE PROVISIONING CODE GENERATION

(71) Applicant: Salesforce, Inc., San Francisco, CA (US)

(72) Inventors: Simone Mainardi, Dublin (IE); Luis Campo Giralte, Dublin (IE)

(73) Assignee: Salesforce, Inc., San Francisco, CA (US)

( * ) Notice: Subject to any disclaimer, the term of this patent is extended or adjusted under 35 U.S.C. 154(b) by 406 days.

(21) Appl. No.: 18/405,903

(22) Filed: Jan. 5, 2024

(65) Prior Publication Data

US 2025/0224932 A1 Jul. 10, 2025

(51) Int. Cl.
*G06F 8/33* (2018.01)

(52) U.S. Cl.
CPC ........................................ *G06F 8/33* (2013.01)

(58) Field of Classification Search
None
See application file for complete search history.

(56) References Cited

U.S. PATENT DOCUMENTS 12,106,393 B1 * 10/2024 Ward .................... G06Q 50/265
2018/0189100 A1 * 7/2018 Nemoto ................ G06F 9/4831
2019/0014124 A1 * 1/2019 Reddy ................. H04L 41/5019
2021/0182248 A1 * 6/2021 Jayanthi .............. G06F 9/45558
2023/0236871 A1 * 7/2023 Marzorati ............... G06F 30/27
718/100
2025/0200447 A1 * 6/2025 Collins .................. G06N 20/20
2026/0012430 A1 * 1/2026 Bhat ..................... H04L 47/822
2026/0012431 A1 * 1/2026 Bhat ..................... H04L 47/822

OTHER PUBLICATIONS

Govindaraj et al., "A Review on Various Applications of Reputation Based Trust Management," International Journal of Interactive Mobile Technologies (iJIM), 2021. (Year: 2021).*
Hillebrand et al., "Towards Reputation-as-a-Service," IEEE, 2013. (Year: 2013).*
Javaid, Muhammad Adeel, "Implementation of a Novel Peer-to-Peer Reputation-Based Trust Management Model in a Cloud Service Provisioning Environment," SSRN Electronic Journal, 2012. (Year: 2012).*

* cited by examiner

*Primary Examiner* — Ryan D. Coyer
(74) *Attorney, Agent, or Firm* — Holland & Hart, LLP.

(57) ABSTRACT

An application server may receive user input indicating a plurality of provisioning parameters for provisioning resources on a cloud substrate. The application server may transmit, to a first artificial intelligence (AI) model, the plurality of provisioning parameters and a request to generate, based on the plurality of provisioning parameters, provisioning code associated with the cloud substrate. The application server may transmit, to one or more second AI models, the provisioning code generated by the first AI model, the plurality of provisioning parameters, and a request to analyze the provisioning code based on the plurality of provisioning parameters. The application server may update respective reputation values associated with the first AI model and the one or more second AI models based on one or more analysis results associated with output of the one or more second AI models.

20 Claims, 10 Drawing Sheets

200

AI QUORUM FOR RESOURCE PROVISIONING CODE GENERATION

FIELD OF TECHNOLOGY

The present disclosure relates generally to database systems and data processing, and more specifically to AI quorum for resource provisioning code generation.

BACKGROUND

A cloud platform (i.e., a computing platform for cloud computing) may be employed by multiple users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some cloud platform scenarios, the cloud platform, a server, or other device may provision cloud-based resources. However, such methods may be improved.

DETAILED DESCRIPTION

Figure 1:
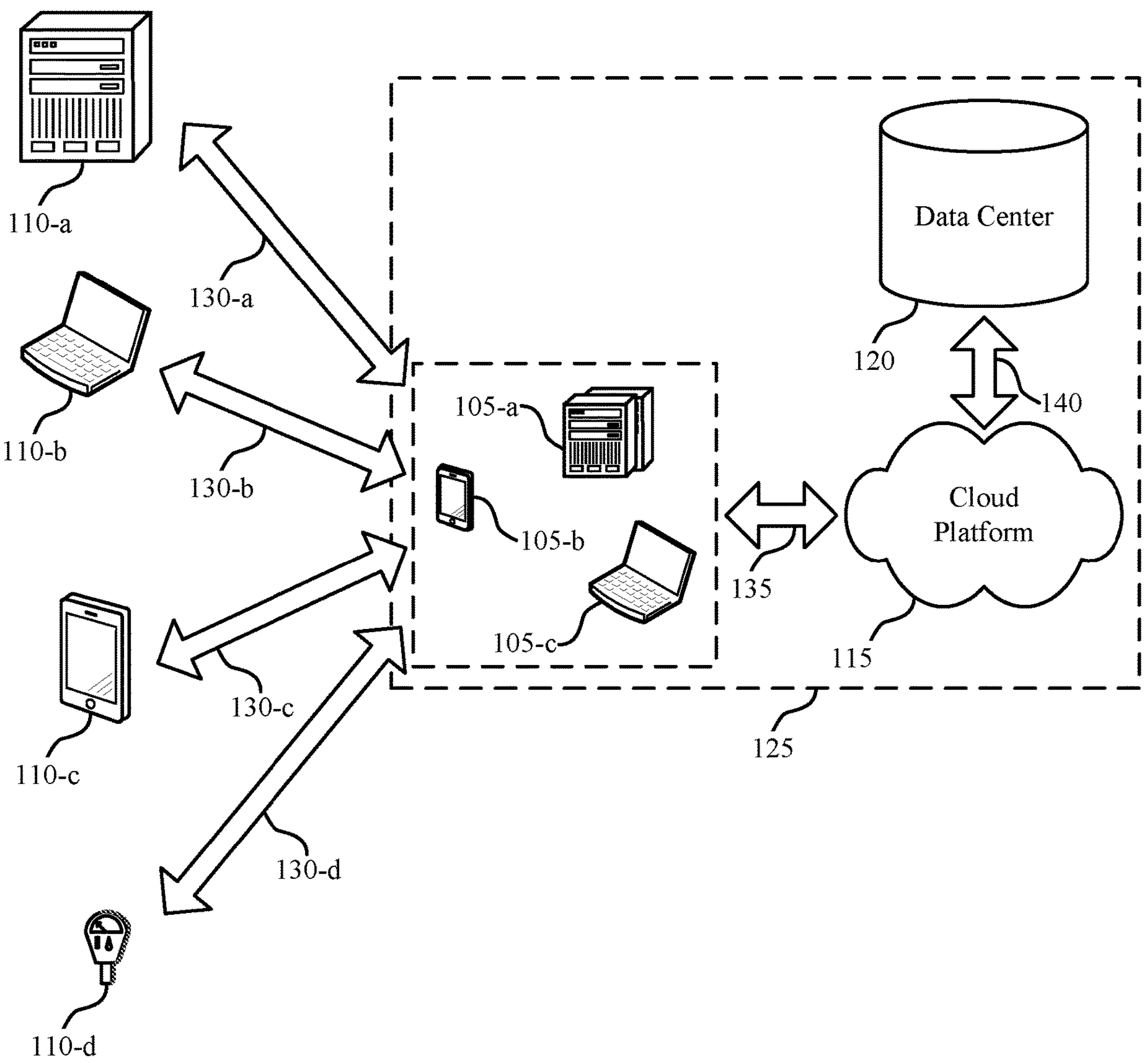
FIG. 1 illustrates an example of a generation of cloud substrate provisioning code system that supports an AI quorum for resource provisioning code generation in accordance with aspects of the present disclosure.

Provisioning resources on various cloud substrates has become challenging due to disparities in their operational methods and interactions. For instance, provisioning a user or a traffic flow on one cloud substrate may involve some API calls, while provisioning on other cloud substrates may involve different API calls or command-line interactions. These disparities cause developers or others to be faced with the daunting task of creating distinct implementations, one for each cloud substrate that are to be provisioned. Consequently, supporting multiple substrates necessitates increased code to maintain, adding complexity and overhead to the provisioning process.

To reduce or eliminate such complexities and overhead, an artificial intelligence (AI)-driven quorum may be employed to generate the disparate code used to provision resources on different cloud substrates. For example, the system may receive information used to provision the resources, such as identity information, a role, a purpose for the resources, or where the resources are to be provisioned. This information may be input into a first AI model that may produce a first response that includes generated code for provisioning the resources on a cloud substrate. The first response and the information for provisioning may be fed to one or more second AI models (e.g., in parallel) to verify or increase confidence in the validity of the first response. The one or more second AI models analyze the code generated by the first AI model and the initial information. The system then determines whether a quorum of the second AI models is reached (as to whether the generated provisioning code is adequate based on the initial information and an analysis of the code itself). If not, the reputations of the various AI models used are updated accordingly. However, if a quorum is reached, then the code is audited and verified before being passed to a secure sandbox for a test execution. The reputation information of the AI models used is then updated based on the quorum information (e.g., whether a quorum was achieved or not), the result of the auditing and verification, and the result of the text execution in the sandbox. In this way, development may be streamlined, scalability and security may be increased, and resource allocation overhead, deployment times, maintenance burdens, and errors may be reduced.

In some examples, different techniques may be used to determine whether a quorum has been reached, including a consensus, a threshold quantity of AI models determining that the code is valid or otherwise satisfies one or more metrics for code quality, weighting of different AI models' input to the quorum, or any combination thereof. In some examples, the code may be validated (e.g., for quality, security, failure, or any combination thereof). In some examples, the code may be executed in a secure sandbox to verify operation, security considerations, exit code considerations, internet protocol (IP) address considerations, or any combination thereof.

Aspects of the disclosure are initially described in the context of an environment supporting an on-demand database service. Aspects of the disclosure are then described with reference to a system, provisioning code generation schemes, and a process flow: Aspects of the disclosure are further illustrated by and described with reference to apparatus diagrams, system diagrams, and flowcharts that relate to AI quorum for resource provisioning code generation.

FIG. 1 illustrates an example of a system 100 for cloud computing that supports an AI quorum for resource provisioning code generation in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The system 100 may be an example of a multi-tenant system. For example, the system 100 may store data and provide applications, solutions, or any other functionality for multiple tenants concurrently. A tenant may be an example of a group of users (e.g., an organization) associated with a same tenant identifier (ID) who share access, privileges, or both for the system 100. The system 100 may effectively separate data and processes for a first tenant from data and processes for other tenants using a system architecture, logic, or both that support secure multi-tenancy. In some examples, the system 100 may include or be an example of a multi-tenant database system. A multi-tenant database system may store data for different tenants in a single database or a single set of databases. For example, the multi-tenant database system may store data for multiple tenants within a single table (e.g., in different rows) of a database. To support multi-tenant security, the multi-tenant database system may prohibit (e.g., restrict) a first tenant from accessing, viewing, or interacting in any way with data or rows associated with a different tenant. As such, tenant data for the first tenant may be isolated (e.g., logically isolated) from tenant data for a second tenant, and the tenant data for the first tenant may be invisible (or otherwise transparent) to the second tenant. The multi-tenant database system may additionally use encryption techniques to further protect tenant-specific data from unauthorized access (e.g., by another tenant).

Additionally, or alternatively, the multi-tenant system may support multi-tenancy for software applications and infrastructure. In some cases, the multi-tenant system may maintain a single instance of a software application and architecture supporting the software application in order to serve multiple different tenants (e.g., organizations, customers). For example, multiple tenants may share the same software application, the same underlying architecture, the same resources (e.g., compute resources, memory resources), the same database, the same servers or cloud-based resources, or any combination thereof. For example, the system 100 may run a single instance of software on a processing device (e.g., a server, server cluster, virtual machine) to serve multiple tenants. Such a multi-tenant system may provide for efficient integrations (e.g., using application programming interfaces (APIs)) by applying the integrations to the same software application and underlying architectures supporting multiple tenants. In some cases, processing resources, memory resources, or both may be shared by multiple tenants.

As described herein, the system 100 may support any configuration for providing multi-tenant functionality. For example, the system 100 may organize resources (e.g., processing resources, memory resources) to support tenant isolation (e.g., tenant-specific resources), tenant isolation within a shared resource (e.g., within a single instance of a resource), tenant-specific resources in a resource group, tenant-specific resource groups corresponding to a same subscription, tenant-specific subscriptions, or any combination thereof. The system 100 may support scaling of tenants within the multi-tenant system, for example, using scale triggers, automatic scaling procedures, scaling requests, or any combination thereof. In some cases, the system 100 may implement one or more scaling rules to enable relatively fair sharing of resources across tenants. For example, a tenant may have a threshold quantity of processing resources, memory resources, or both to use, which in some cases may be tied to a subscription by the tenant.

A cloud client 105 may communicate with the cloud platform 115 to generate provisioning code for a cloud substrate. For example, the cloud platform 115 may receive input from the cloud client 105 that may include one or more parameters for provisioning the resources of the cloud substrate. The cloud platform 115 may pass the provisioning parameters and a request for code generation to a first AI model, which may generate provisioning code. The cloud platform 115 may then pass the generated code and a request for one or more second AI models to process the generated code and determine whether the code is adequate for the provisioning requested by the cloud client 105. The cloud platform 115 may update one or more reputation ratings for one or more of the AI models based on results generated by such one or more AI models.

Different cloud substrates involve the use of different provisioning approaches, including different code considerations that are involved with provisioning resources on the cloud substrates. For example, code for provisioning cloud substrate resources may vary widely across different could substrates, despite, in some cases, producing similar results. Some cloud substrates may involve some API calls, command line interactions, or other operations that may be unrelated to other API calls, command line interactions, or other operations for other cloud substrates. As such, developers and users often create multiple, distinct implementations to handle the differing considerations for cloud substrates.

By implementing the techniques described herein, a system or cloud platform (e.g., the system 100, the cloud platform 115, another system, another platform, or any combination thereof) may generate provisioning code and verify or analyze such provisioning code using a quorum of AI models. The generation of the provisioning code may take into account the differing considerations of different cloud substrates, as the various considerations may be accounted for in the instructions to the AI models, the training data for the AI models, or any combination thereof. Accuracy of the provisioned code and the analysis thereof may be improved through the use of the quorum, as different models may interpret the code or instructions differently, providing improved generation and analysis of the provisioning code. Further, as more code is generated, reputation information or ratings may be updated and the system may identify or categorize models that perform better for different tasks (e.g., code generation versus quorum-based verification or analysis), cloud substrates, provisioning approaches, other considerations as described herein, or any combination thereof).

For example, a user may transmit a request to a system to generate provisioning code for provisioning resources on a cloud substrate. The system may take provisioning parameters or information from the user's request (optionally augmenting the user's input with additional information or parameters associated with the cloud substrate) and may request generation of the provisioning code. The system may transmit the generated code to one or more other AI models that may individually analyze the request, the generated code, one or more provisioning parameters, or any combination thereof, to determine whether the generated code is appropriate for provisioning the cloud substrate resources. If the second AI models form a quorum (e.g., using one or more techniques for determining a quorate state), then the code may be passed through one or more verification or validation operations to further ensure that the code complies with other considerations (e.g., security considerations) and that the code functions as desired. Further, the reputation ratings for the AI models may be updated based on the verification or validation operations. For example, in a situation in which the code fails verification or validation, an AI model that indicates that the code was valid may receive a reduced or negative reputation score or adjustments, whereas an AI model that indicates that the code was invalid may receive an increased or positive reputation score or adjustment. The code (e.g., if validated or verified) may be passed to the user for use in provisioning the cloud substrate resources.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
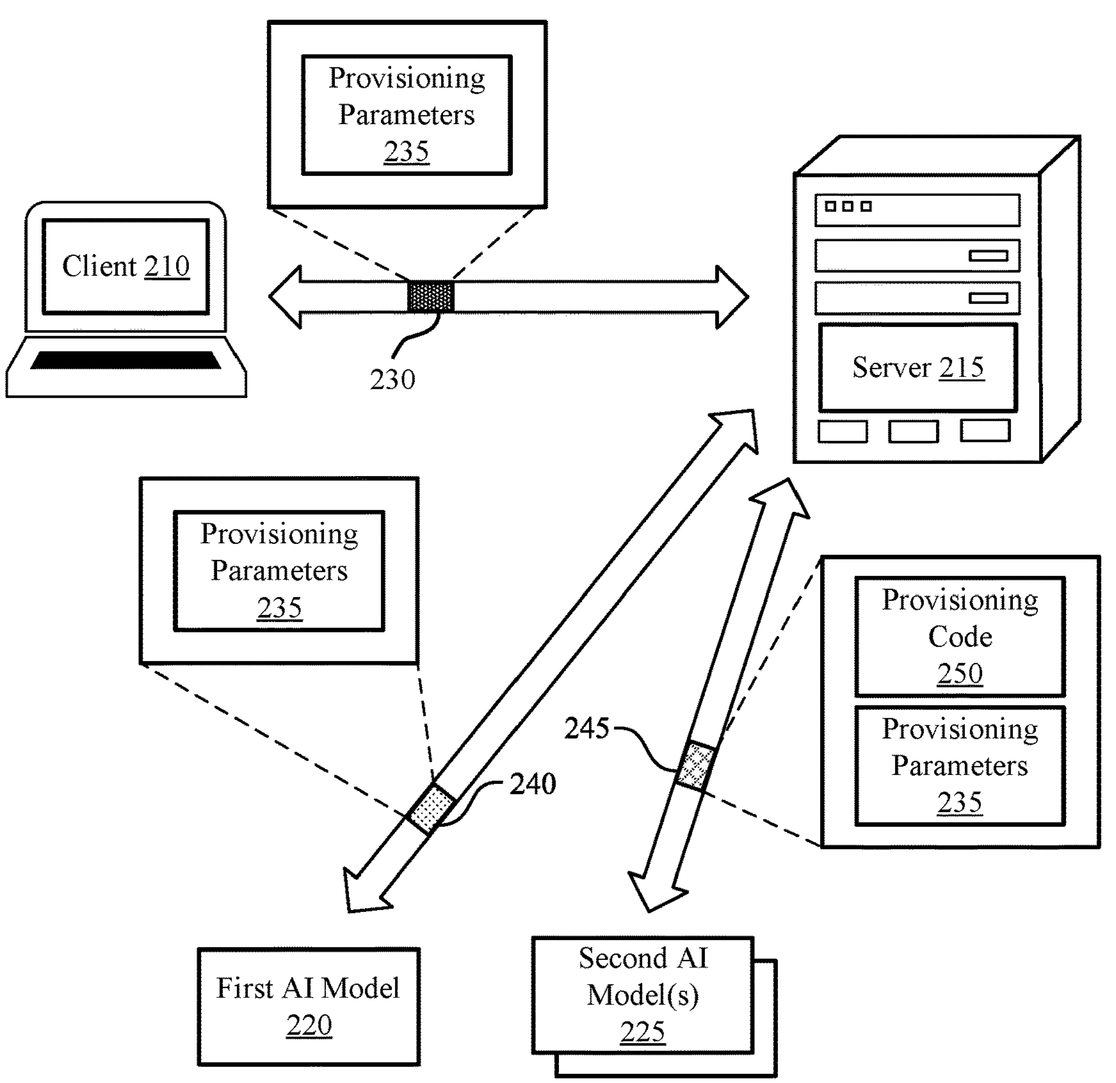
FIG. 2 shows an example of a system that supports an AI quorum for resource provisioning code generation in accordance with aspects of the present disclosure.
Figure 2:
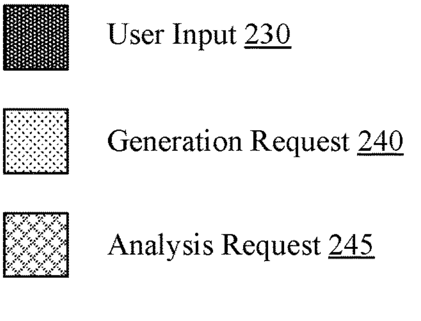

FIG. 2 shows an example of a system 200 that supports an AI quorum for resource provisioning code generation in accordance with aspects of the present disclosure.

In today's landscape, provisioning resources on various cloud substrates has become challenging due to disparities in their operational methods and interactions. For instance, provisioning a user or a traffic flow on AWS may involve certain API calls, while other cloud vendors might necessitate different API calls or command-line interactions.

For example, launching an operating system instance on different cloud substrates may involve different operations. For each cloud substrate, a traffic flow may be provisioned (e.g., for the instance to be reachable over the network). The provisioning of this flow (e.g., a simple rule to allow inbound traffic on a particular port to support a remote desktop protocol) may be quite different depending on the corresponding substrate.

For example, provisioning code for a first cloud substrate may be as shown in the following example:

aws ec2 authorize-security-group—ingress-group-id sg-12345678—protocol tcp—port 3389—cidr x.X.X.X/X However, provisioning code for a second cloud substrate may be different, as shown in the following example:

az network nsg rule create—resource-group my ResourceGroup—nsg-name myNSG—name RDP-rule—priority 300—destination-address-prefixes '*'—destination-port-ranges 3389—protocol Tcp—description "Allow RDP"

These disparities may cause developers to create distinct implementations, one for each cloud substrate that are to be provisioned. Consequently, supporting multiple substrates necessitates increased code to maintain, adding complexity and overhead to the provisioning process.

The subject matter described herein addresses the issue of provisioning resources across diverse cloud substrates through multiple approaches, including the use of AI and natural language processing to generate all the associated code to provision resources across multiple cloud substrates, verification of such generated code, and "zero trust" code execution for rigorous testing and verification of the code within a sandboxed environment. Though examples provided herein describe generation of provisioning code for cloud substrates, the techniques and subject matter herein may be applied to any operation of a cloud substrate or other system for which code may be employed.

The subject matter herein may employ multiple AI systems (e.g., the first AI model 220 and one or more second AI models 225) for processing natural language. The process orchestrates collaboration among these AI models to both generate code and enhance confidence in the resulting code by achieving an AI-driven consensus, quorum, or other level of agreement between multiple AI models. Further, the generated code may undergo rigorous testing and verification (e.g., within a sandbox environment), leading to updates in an AI reputation database. Such processes serve to validate both the accuracy of the code and the successful implementation of the intended changes on the cloud substrate. Further, it enables the rewarding or penalizing of AI models based on the execution outcomes.

For example, the client 210 may provide one or more provisioning parameters 235 (e.g., as indicated by the user input 230) for provisioning one or more cloud substrates to the server 215 (or for any other operation associated with one or more cloud substrates). The server 215 may transmit the generation request 240 that may include the provisioning parameters 235 to the first AI model 220, which may be tasked with generating provisioning code 250 (or code for any other operation associated with one or more cloud substrates) based on the provisioning parameters 235, the generation request 240, or any combination thereof. The first AI model 220 may transmit the provisioning code 250 to the server 215. However, in some examples the first AI model 220 may transmit the provisioning code 250 directly to the second AI model(s) 225.

In response to receiving the provisioning code 250, the server 215 may transmit the analysis request 245 to the second AI model(s) 225. The analysis request 245 may include the provisioning code 250, the provisioning parameters 235, or any combination thereof. The second AI model(s) 225 may analyze the provisioning code 250, the provisioning parameters 235, or any combination thereof to determine whether the provisioning code 250 is appropriate for provisioning resources on a cloud substrate. For example, the server 215 may include in the analysis request 245 one or more instructions for the second AI model(s) 225 to determine whether the provisioning code 250 is a valid solution to cause changes in the cloud substrate bringing the cloud substrate to the intended state (e.g., as described in the user input 230, the provisioning parameters 235, or any combination thereof).

In some examples, the server 215 or any other element of the system 200 (or any combination thereof) may determine whether a quorum of the second AI model(s) 225 was reached as to whether the provisioning code 250 is valid or correct for provisioning the resources in the cloud substrate (or for any other operation associated with the cloud substrate). For example, if at least a threshold quantity of the second AI model(s) 225 determine that the provisioning code 250 is valid, then an analysis result of the second AI model(s) 225 may indicate that the provisioning code 250 is valid.

Based on the results of the analysis performed by the second AI model(s) or one or more associated analysis results, the system may update one or more reputation values of the first AI model 220, the second AI model(s) 225, or any combination thereof based on the analysis. For example, if a quorum of the second AI model(s) 225 is reached, the reputation value of the first AI model 220 that generated the code may be increased. Further, in some examples, the second AI model(s) 225 that formed the quorum may also receive respective increased reputation values, while any second AI model(s) 225 that did not form the quorum (e.g., did not determine that the code was valid or made one or more determinations different than those reached by second AI model(s) 225 that formed the quorum) may receive decreased reputation values.

Thus, the system 200 or other devices performing the techniques described herein may reduce or eliminate technical problems present in other approaches. For example, the use of the subject matter herein may reduce or eliminate developer's efforts spent on producing separate implementations on different substrates, reducing development costs associated with platform-specific code. Development may be streamlines, as the coding process may be simplified by generating uniform provisioning code, saving valuable developer time and effort. Resource allocation may be improved, as the allocation of resources across diverse substrates may be improved, reducing usage and minimizing unnecessary expenses. Scalability of solutions utilizing cloud substrates may be improved, facilitating seamless scaling across multiple cloud platforms, allowing expansion of operations without significant overheads. Deployment may be accelerated by speeding up deployment cycles by providing standardized, ready-to-use provisioning code, enhancing overall project timelines. Maintenance burdens may be reduced by providing stable, standardized provisioning code, reducing frequent updates and fixes. Security may be improved though the use of "zero trust" code execution, promoting rigorous testing and verification, leading to a more secure environment for cloud-based operations. Compliance may be improved, as maintaining regulatory compliance across different cloud platforms is simplified, reducing legal and compliance-related risks. Time to market of solutions implemented on cloud substrates may be reduced, shortening the time it takes to launch products or services across diverse cloud platforms, enabling quicker market entry and revenue generation. Operational agility may be improved by allowing swift adaptation to changing cloud technologies and vendor considerations, promoting competitiveness. Vendor flexibility may be increased, as switching between cloud substrates is simplified, discouraging vendor lock-in and increasing flexibility. The likelihood of human errors may be reduced during the provisioning process, promoting accuracy and reliability in cloud resource setups. Management of resources may be unified, simplifying the management of resources across different cloud substrates, offering a centralized approach for easier monitoring and control.

Figure 3:
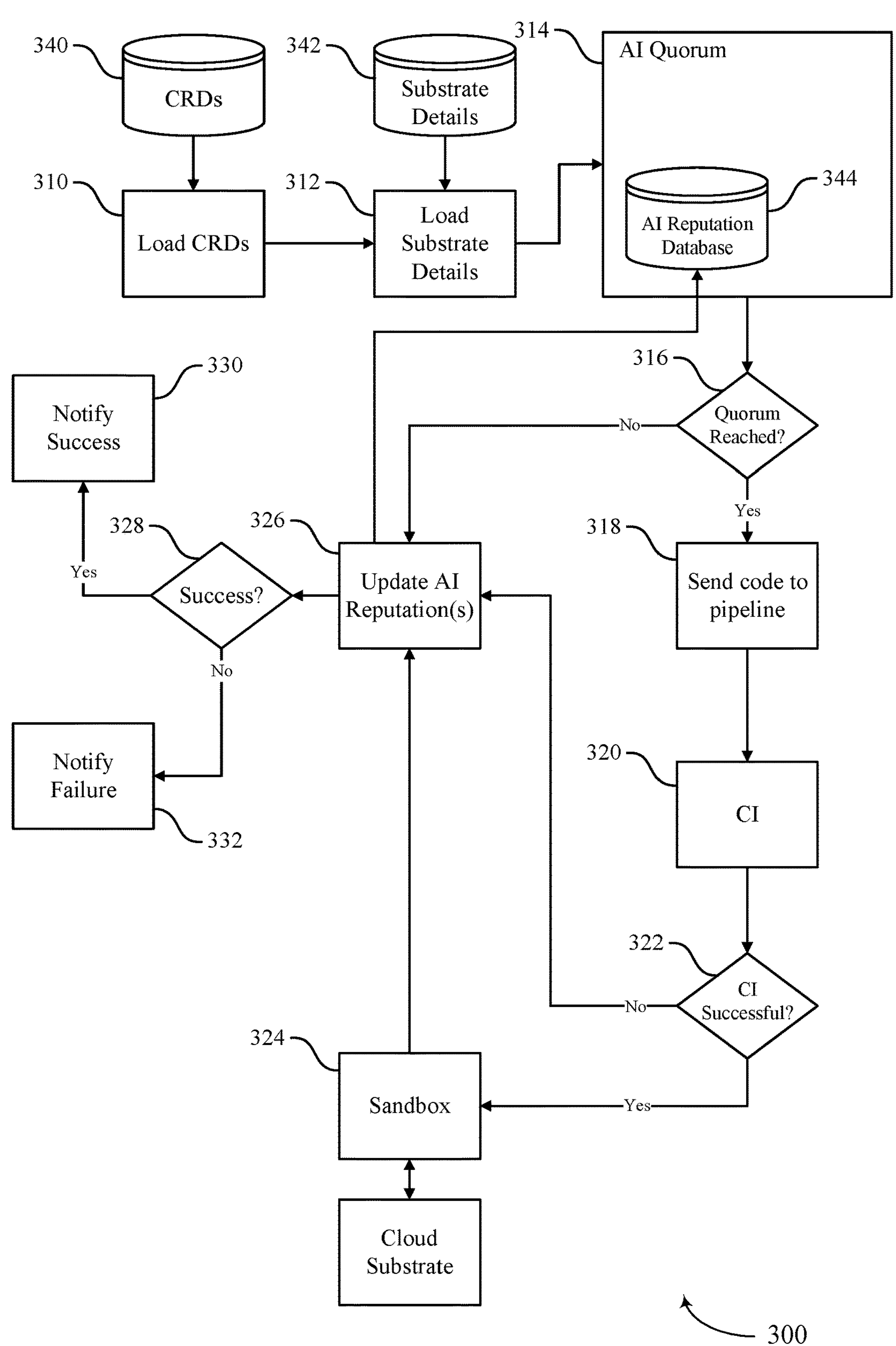
FIG. 3 shows an example of a provisioning code generation scheme that supports an AI quorum for resource provisioning code generation in accordance with aspects of the present disclosure.

FIG. 3 shows an example of a provisioning code generation scheme 300 that supports an AI quorum for resource provisioning code generation in accordance with aspects of the present disclosure.

The provisioning code generation scheme 300 may describe elements of a code generation process performed by a system that utilizes multiple AI models to determine whether provisioning code (or other code generated by a first AI model) is valid or sufficient for a provisioning task (or other task) associated with a cloud substrate.

At 310, the system may load one or more custom resource definitions (CRDs) 340, which store information that intended to be pushed to different cloud substrates. Such data may be stored in one or more formats, including JavaScript object notation (JSON) or YAML ain't markup language (YAML) format. In some examples, the CRDs 340 information may be declarative (that is, it declares a new intended state for the substrates). One example of a CRD 340 is shown below:

```
name: John
surname: Doe
role: administrator
substrate: hyperforce-uswest2
```

Though CRDs 340 may vary from case to case, CRDs 340 may include an indication of the substrate to which the CRD 340 is applicable. Such an indication may be an abstraction of the cloud substrate. For example, the indication may include a role (e.g., an organizational or role within a processing system), a domain, an instance, or any combination thereof.

At 312, the system may load the substrate details 342 based on the one or more CRDs 340. For example, a cloud substrate may be identified based on the CRD 340 and additional substrate details 342 may be determined or retrieved. The substrate details 342 may include an identifier of the cloud substrate, a region associated with the cloud substrate, a zone associated with the cloud substrate, or any combination thereof. In some examples, a translation from information in the CRD 340 to information associated with one or more cloud substrates may be performed and may result in a DNS name. For example, a specification in the CRD 340 of "hyperforce-uswest2" may be translated into two cloud substrates. Using the examples of an AWS cloud substrate and Azure cloud substrate, the CRD 340 may be modified as follows:

```
user:
name: John
surname: Doe
role: administrator
substrates:
  name: aws-dev-uswest2.aws.com
    substrate: aws
  name: us.contoso.com
    substrate: azure
```

At 316, the AI quorum 314 may receive the CRD 340 (or multiple CRDs) as input. At this stage, the CRD 340 may be or may include one or more declarations of an intended state for the substrate or substrates, augmented with substrate details. The intended substrate state and substrate details may be sent to a first AI model along with a natural-language question aimed at obtaining code with a sequence of imperative commands that will bring the substrate from the actual to the new intended state. The AI model may return code (e.g., provisioning code) that may be or may include a sequence of representational state transfer (REST) application programming interface (API) calls, a sequence of shell commands, one or more other portions of code, or any combination thereof. The returned code may be transmitted to multiple additional AI models with the aim to reach a quorum or other level of agreement between the AI models. The additional AI models may each analyze the provisioning code and may each provide an analysis result as to whether the code obtained is a valid solution to bring the substrate from the actual to the new intended state as declared in the CRD 340.

If a portion of the additional AI models' analysis results agree on the solution (e.g., a quantity of additional AI models satisfies a quorum threshold, where these AI models each determine that the code is valid, invalid, or another result), the quorum may be reached and the resulting code is passed as input for further processing. However, if a quorum is not reached, the process may not perform further processing, and the AI model reputations may be updated based on the analysis results of the additional AI models (e.g., at 326). The AI reputation database 344 may be used to weight each AI model during the quorum process. The AI reputation database 344 may be updated as a result of the quorum being reached, the quorum not being reached, as a result of one or more outcomes of other operations in the provisioning code generation scheme 300, or any combination thereof.

At 318, if the quorum is reached, then the generated code may be transmitted to the continuous integration pipeline or other processing elements for further processing, verification, auditing, sandbox execution, or any combination thereof.

At 320, the generated code may be audited to determine whether the code adheres to quality metrics or expectations. For example, the code may be integrated into a continuous integration (CI) pipeline that may assess the quality of the code and may identify issues with the code, such as failures. For example, if the CI pipeline integration or execution is not successful (the pipeline detects any problems during execution of the code), the system may update the AI reputations (e.g., at 326). However, if the pipeline checks pass, the system may continue to operation at the sandbox.

At 324, (e.g., after or in response to verifying the code) the system may create a secure sandbox to execute the code. The execution of the code may be subject to one or more constraints, limitations, or considerations during operation in the sandbox. If the code does not operate in accordance with the constraints, limitations, or considerations, it may be determined that the code fails operation within the sandbox. For example, such constraints, limitations, or considerations may include a specified time frame or one or more desired exit codes. Further, in some examples, the code may operate with a set of IP addresses associated with the DNSs from and access to other network addresses or elements may be disallowed.

At 326, the system may update reputation values for one or more of the AI models, including one or more models that generate the code, one or more models that validate or analyze the code, or any combination thereof. The updating of reputation values may be performed in response to one or more results, events, or process outcomes as described herein (e.g., failure to reach a quorum at 314 or 316, an unsuccessful CI integration at 322, or execution in the sandbox at 324). Here, the AI reputation database 344 may be updated with updates, changes, or creation of AI reputation values and the values of the AI reputation database 344 may then be used in subsequent process execution (e.g., quorum determination, analysis operations, code generation operations, one or more other operations described herein, or any combination thereof). For example, if execution at the sandbox at 324 fails, AI models that produced a result that the generated code was acceptable may have respective AI reputation values updated negatively, whereas AI reputation values for other AI models (e.g., those that indicated that the code would fail or was not valid) may be updated positively.

Similarly, if execution at the sandbox at 324 is successful, the AI models that indicated that the code was invalid or unacceptable will be scored negatively, whereas the others (e.g., those that indicated that the code was valid or acceptable) will be scored positively. Similar updates may be performed when one or more operations described herein fail.

At 328, the system may determine whether the code generation and analysis was successful. If so, at 330, the system may notify a client device or a user device that the code generation and analysis was successful. However, if the code generation, code analysis, or both, were not successful, at 332 the system may notify that the code generation, code analysis, or both, were not successful.

Figure 4:
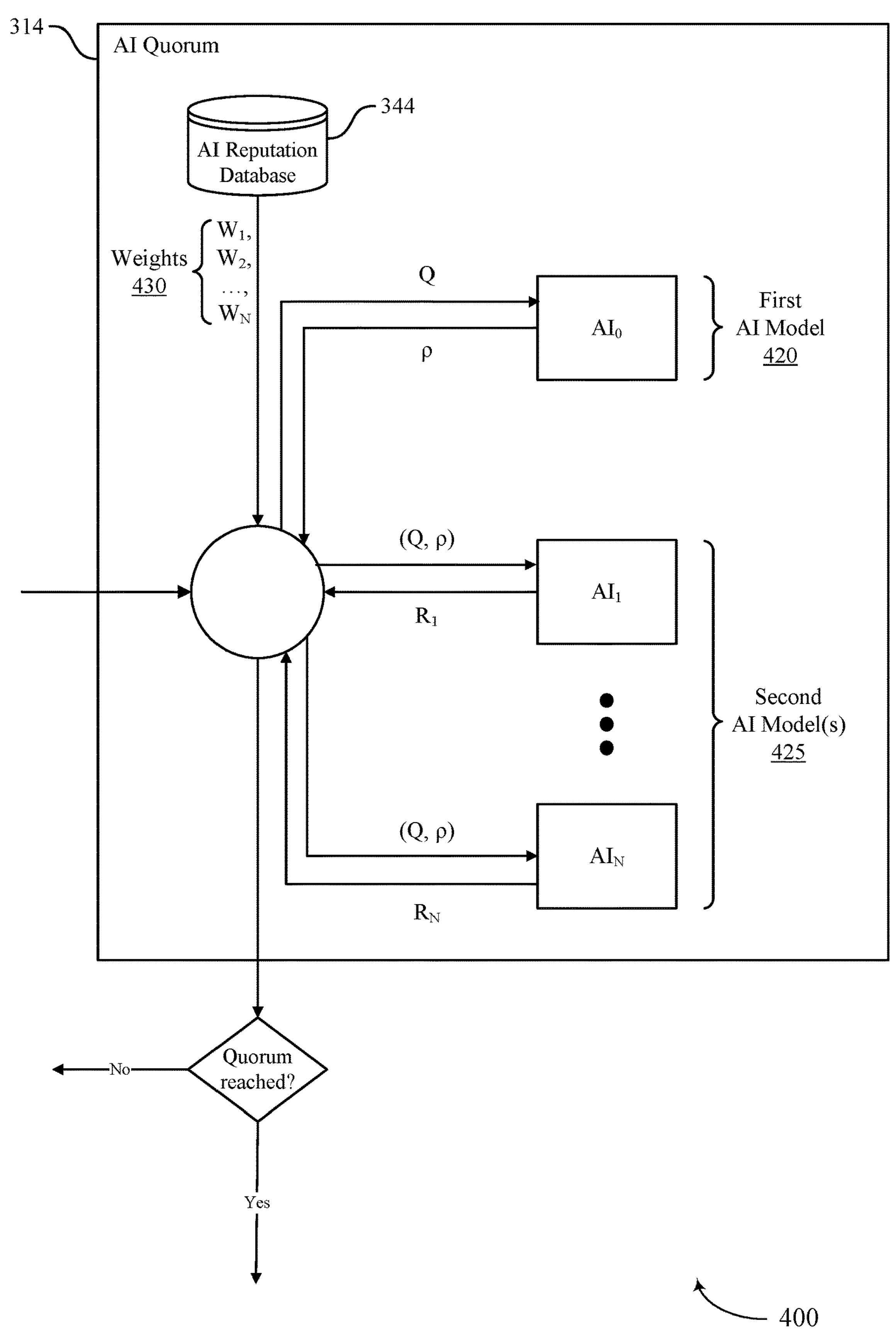
FIG. 4 shows an example of a provisioning code generation scheme that supports an AI quorum for resource provisioning code generation in accordance with aspects of the present disclosure.

FIG. 4 shows an example of a provisioning code generation scheme 400 that supports an AI quorum for resource provisioning code generation in accordance with aspects of the present disclosure.

The provisioning code generation scheme 400 describes operations at the AI quorum 314. The AI quorum 314 is general and, while it is applicable to the problem of generating and validating provisioning, it is described here in abstract terms to demonstrate its applicability to any problem where multiple AIs are utilized to enhance the confidence of a response.

Given a quantity of N+1 AI models (e.g., $AI_0$, $AI_1$, $AI_2$, . . . , $AI_N$) that are able to respond to natural language questions, an overall process may be as follows. A first stage may include one or more initialization operations in which a first question Q is transmitted to the first AI model 420 (also referred to as $AI_0$) which may respond with the response, p. Examples of the question Q and response p for a first cloud substrate (e.g., AWS) and a second cloud substrate (e.g., Azure) may be as follows:

AWS:

Q: "Create the AWS CLI commands to allow TCP port 3389 on our EC2 instance"

p: aws ec2 authorize-security-group-ingress—group-id sg-12345678—protocol tcp—port 3389—cidr x.X.X.x/X Azure:

Q: "Create the Azure CLI commands to allow TCP port 3389"

p: az network nsg rule create—resource-group my ResourceGroup—nsg-name myNSG—name RDP-rule—priority 300—destination-address-prefixes '*'—destination port-ranges 3389—protocol Tcp—description "Allow RDP"

A second stage may include one or more quorum verification operations in which the second AI model(s) 425 (e.g., $AI_1$, $AI_2$, . . . , $AI_N$ are used to analyze or enhance confidence whether p is an acceptable response for the question Q. To enhance confidence, the response p is processed by the second AI model(s) 425 (e.g., the remaining $AI_1$, $AI_2$, . . . , $AI_N$) to generate corresponding responses $R_1$, $R_2$, . . . , $R_N$, where, in some examples, $R_i$ is a binary variable (e.g., either 1 or 0). For each i between 1 and N, $R_i$ is 1 if $AI_i$ determines that p is an acceptable response to Q (or satisfies a confidence threshold) and $R_i$ may be 0 if $AI_i$ determines that p is not an acceptable response to Q (or satisfies a confidence threshold).

In some examples, a quorum may be achieved in different ways. In some examples, a consensus of the second AI model(s) 425 may be a threshold to be satisfied for the AI quorum 314 to determine that the code is valid. In a consensus approach, to determine that the code is valid or appropriate in light of the question Q, all of the second AI model(s) 425 used to analyze the response p from the first AI model 420 the AIs determine that p is an acceptable response to Q. Such a technique may be expressed as the following:

```
for each (i in 1,2,. . ., N){
  R_i ← (is ρ is an acceptable response to Q for AI_N)
  if (R_i is 0) { exit<"Consensus not reached"> }
}
exit<"Consensus reached, return ρ">
```

In some examples, a quorum may be a threshold to be satisfied for the AI quorum 314 to determine that the code is valid. In one example of such a technique, to achieve a quorum, at least a portion (e.g., at least a threshold quantity) of the second AI model(s) 425 determine that p is an acceptable response to Q (or satisfy an associated confidence threshold). For example, a threshold value K may be 0≤K≤N, where K is a minimum quantity of the second AI model(s) 425 that determine that p is an acceptable response to Q. Such a technique may be expressed as the following

```
current_quorum ← 0
for each (i in 1,2,. . ., N){
  R_i ← (is ρ is an acceptable response to Q for AI_i)
  if (R_i is 1) { current_quorum ← current_quorum + 1 }
  if (current_quorum ≥ K) { exit<"Quorum reached, return ρ"> }
}
exit<"Quorum not reached">
```

In some examples, the quorum technique may be a generalization of the consensus technique. By setting K equal to N, the quorum technique may reduce to the consensus technique.

In some examples, a system may consider the weights 430 corresponding to the first AI model 420, the second AI model(s) 425, or any combination thereof. The weights 430 may give each AI model more or less importance as compared to the other AIs. For example, the weights 430 may be defined as $W_1$, $W_2$, . . . , $W_N$ that may correspond to $AI_1$, $AI_2$, . . . , $AI_N$ (e.g., where $W_i$ is a real number $0 \le W_i \le 1$ for each i between 1 and N) and the quorum W may be defined such that W is a real number 0≤W≤1. Thus, an example technique involving weights may be expressed as follows:

```
current_quorum ← 0
for each (i in 1,2,..,N){
  R_i ← (is ρ is an acceptable response to Q for AI_i?)
  if (R_i is 1) { current_quorum ← current_quorum + W_i }
  if (current_quorum ≥ W) { exit<"Quorum reached, return ρ"> }
}
exit<"Quorum not reached">
```

In some examples, the weighting technique may be a generalization of the quorum technique. By setting w; equal to 1 for each i between 1 and N, and changing the domain of W such that it becomes an integer equal to N, the weighting technique reduces to the quorum technique.

In some examples, the variables $R_i$ may be set to be real numbers such that 0≤Ri≤1, expressing a degree of confidence such that 0 is a minimum degree of confidence that p is an acceptable response to Q and 1 is a maximum degree of confidence that p is an acceptable response to Q. The techniques described herein may be applied regardless of whether $R_i$ is expressed as a binary variable or a real number.

Figure 5:
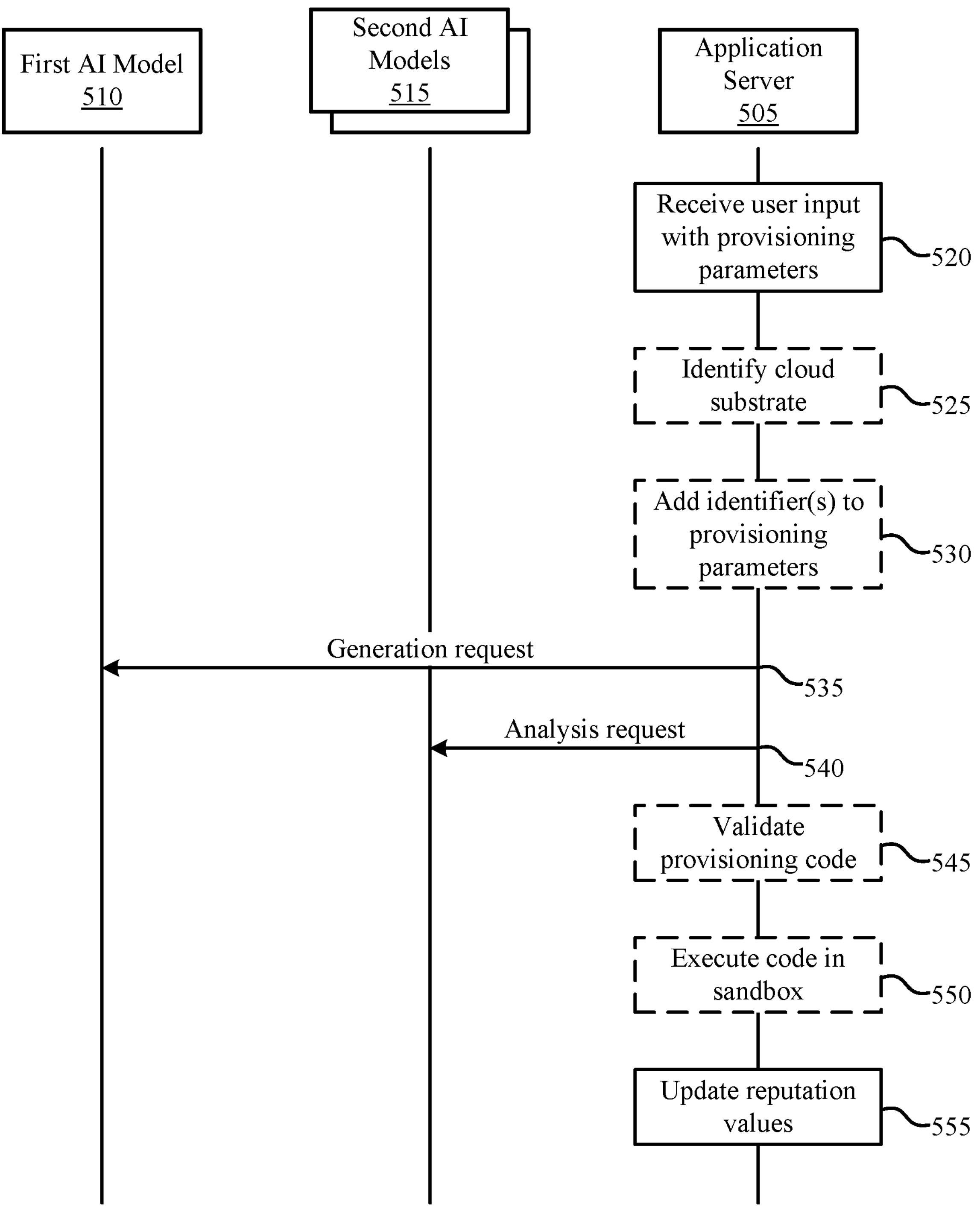
FIG. 5 shows an example of a process flow that supports an AI quorum for resource provisioning code generation in accordance with aspects of the present disclosure.

FIG. 5 shows an example of a process flow 500 that supports an AI quorum for resource provisioning code generation in accordance with aspects of the present disclosure.

The process flow 500 may implement various aspects of the present disclosure described herein. The elements described in the process flow 500 (e.g., the application server 505, the first AI model 510, the one or more second AI models 515, or any combination thereof) may be examples of similarly named elements described herein.

In the following description of the process flow 500, the operations between the various entities or elements may be performed in different orders or at different times. Some operations may also be left out of the process flow 500, or other operations may be added. Although the various entities or elements are shown performing the operations of the process flow 500, some aspects of some operations may also be performed by other entities or elements of the process flow 500 or by entities or elements that are not depicted in the process flow, or any combination thereof.

At 520, the application server 505 may receive user input indicating that may indicate a plurality of provisioning parameters for provisioning resources on a cloud substrate. In some examples, the plurality of provisioning parameters may include a user identifier, a user role, a geographical region, a processing platform with which the resources on the cloud substrate are to be associated, or any combination thereof. In some examples, the plurality of provisioning parameters are expressed in natural language.

At 525, the application server 505 may identify the cloud substrate based on at least one of the plurality of provisioning parameters.

At 530, the application server 505 may add one or more identifiers associated with the cloud substrate to the plurality of provisioning parameters.

At 535, the application server 505 may transmit, to a first artificial intelligence (AI) model 510, the plurality of provisioning parameters and a request to generate, based on the plurality of provisioning parameters, provisioning code associated with the cloud substrate. In some examples, the provisioning code may include one or more application programming interface (API) calls, one or more shell commands, or any combination thereof.

At 540, the application server 505 may transmit, to one or more second AI models 515, the provisioning code generated by the first AI model 510, the plurality of provisioning parameters, and a request to analyze the provisioning code based on the plurality of provisioning parameters. In some examples, the first AI model 510, the one or more second AI models 515, or any combination thereof are large language models.

At 545, the application server 505 may validate the provisioning code to generate a code validation result based on a quality analysis, a security analysis, a failure analysis, or any combination thereof, where the code validation result is comprised in the one or more analysis results.

At 550, the application server 505 may execute, in accordance with one or more sandbox restrictions, the provisioning code in a sandbox environment to produce the sandbox execution result, the one or more sandbox restrictions that may include a time frame restriction, an exit code restriction, an internet protocol (IP) address restriction, or any combination thereof.

At 555, the application server 505 may update respective reputation values associated with the first AI model 510 and the one or more second AI models 515 based on one or more analysis results associated with output of the one or more second AI models 515. In some examples, the one or more analysis results comprise a determination of a quorate state of the one or more second AI models 515 in which a quorum of the one or more second AI models 515 determine that the provisioning code is valid code for provisioning the resources on the cloud substrate. In some examples, the determination of the quorate state is based on a consensus of the one or more second AI models 515, a quantity of the one or more second AI models 515 that determine that the provisioning code is valid code that exceeds a threshold value, one or more weights associated with the respective reputation values of the first AI model 510 and the one or more second AI models 515, or any combination thereof. In some examples, updating the respective reputation values may include updating one or more weights for each of the first AI model 510 and the one or more second AI models 515.

Figure 6:
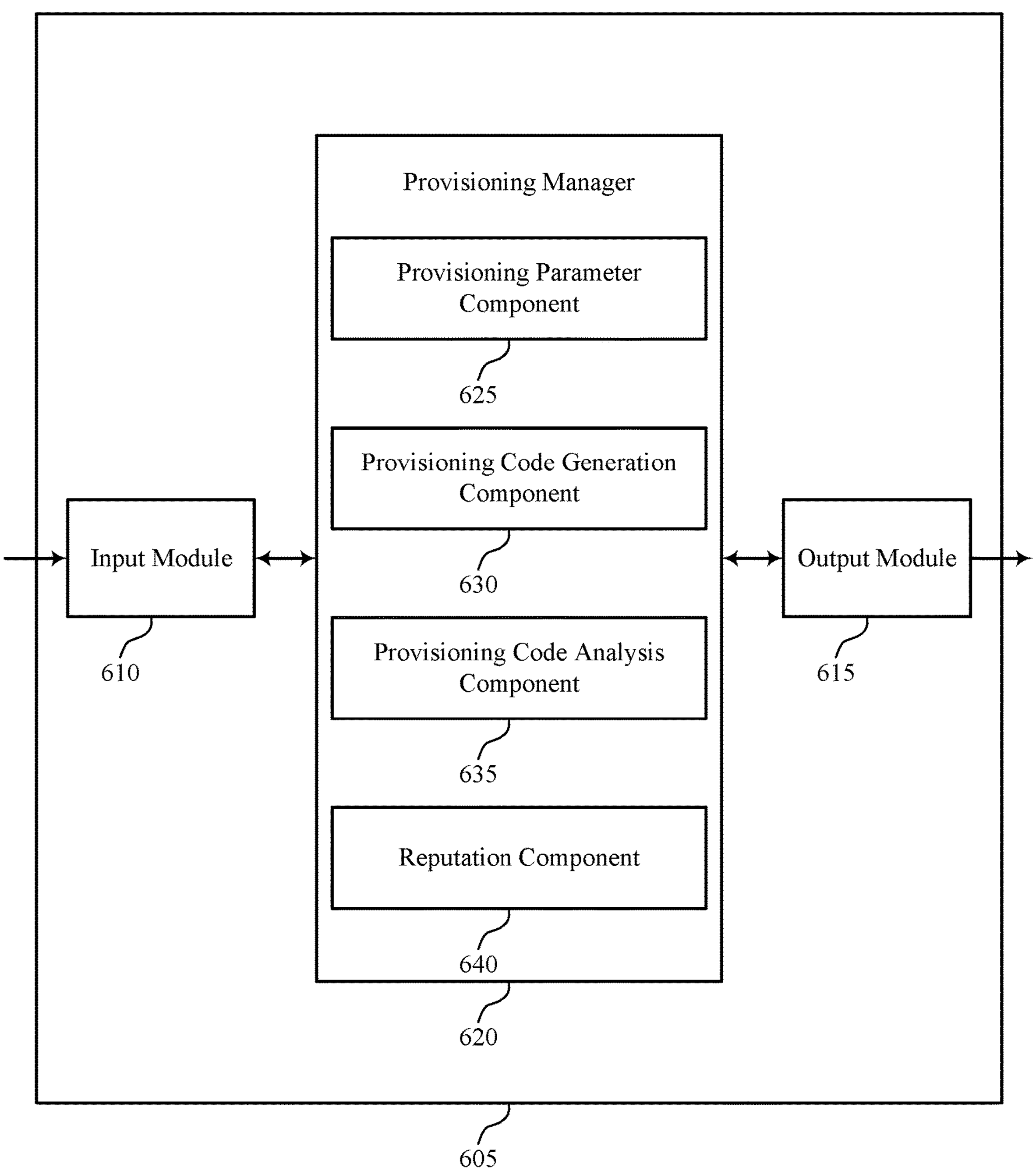
FIG. 6 shows a block diagram of an apparatus that supports an AI quorum for resource provisioning code generation in accordance with aspects of the present disclosure.

FIG. 6 shows a block diagram 600 of a device 605 that supports an AI quorum for resource provisioning code generation in accordance with aspects of the present disclosure. The device 605 may include an input module 610, an output module 615, and a provisioning manager 620. The device 605, or one or more components of the device 605 (e.g., the input module 610, the output module 615, and the provisioning manager 620), may include at least one processor, which may be coupled with at least one memory, to support the described techniques. Each of these components may be in communication with one another (e.g., via one or more buses).

The input module 610 may manage input signals for the device 605. For example, the input module 610 may identify input signals based on an interaction with a modem, a key board, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the device 605 for processing. For example, the input module 610 may transmit input signals to the provisioning manager 620 to support AI quorum for resource provisioning code generation. In some cases, the input module 610 may be a component of an input/output (I/O) controller 810 as described with reference to FIG. 8.

The output module 615 may manage output signals for the device 605. For example, the output module 615 may receive signals from other components of the device 605, such as the provisioning manager 620, and may transmit these signals to other components or devices. In some examples, the output module 615 may transmit output signals for display in a user interface, for storage in a database or data store, for further processing at a server or server cluster, or for any other processes at any number of devices or systems. In some cases, the output module 615 may be a component of an I/O controller 810 as described with reference to FIG. 8.

For example, the provisioning manager 620 may include a provisioning parameter component 625, a provisioning code generation component 630, a provisioning code analysis component 635, a reputation component 640, or any combination thereof. In some examples, the provisioning manager 620, or various components thereof, may be configured to perform various operations (e.g., receiving, monitoring, transmitting) using or otherwise in cooperation with the input module 610, the output module 615, or both. For example, the provisioning manager 620 may receive information from the input module 610, send information to the output module 615, or be integrated in combination with the input module 610, the output module 615, or both to receive information, transmit information, or perform various other operations as described herein.

The provisioning manager 620 may support generation of cloud substrate provisioning code in accordance with examples as disclosed herein. The provisioning parameter component 625 may be configured to support receiving user input indicating a set of multiple provisioning parameters for provisioning resources on a cloud substrate. The provisioning code generation component 630 may be configured to support transmitting, to a first artificial intelligence (AI) model, the set of multiple provisioning parameters and a request to generate, based on the set of multiple provisioning parameters, provisioning code associated with the cloud substrate. The provisioning code analysis component 635 may be configured to support transmitting, to one or more second AI models, the provisioning code generated by the first AI model, the set of multiple provisioning parameters, and a request to analyze the provisioning code based on the set of multiple provisioning parameters. The reputation component 640 may be configured to support updating respective reputation values associated with the first AI model and the one or more second AI models based on one or more analysis results associated with output of the one or more second AI models.

Figure 7:
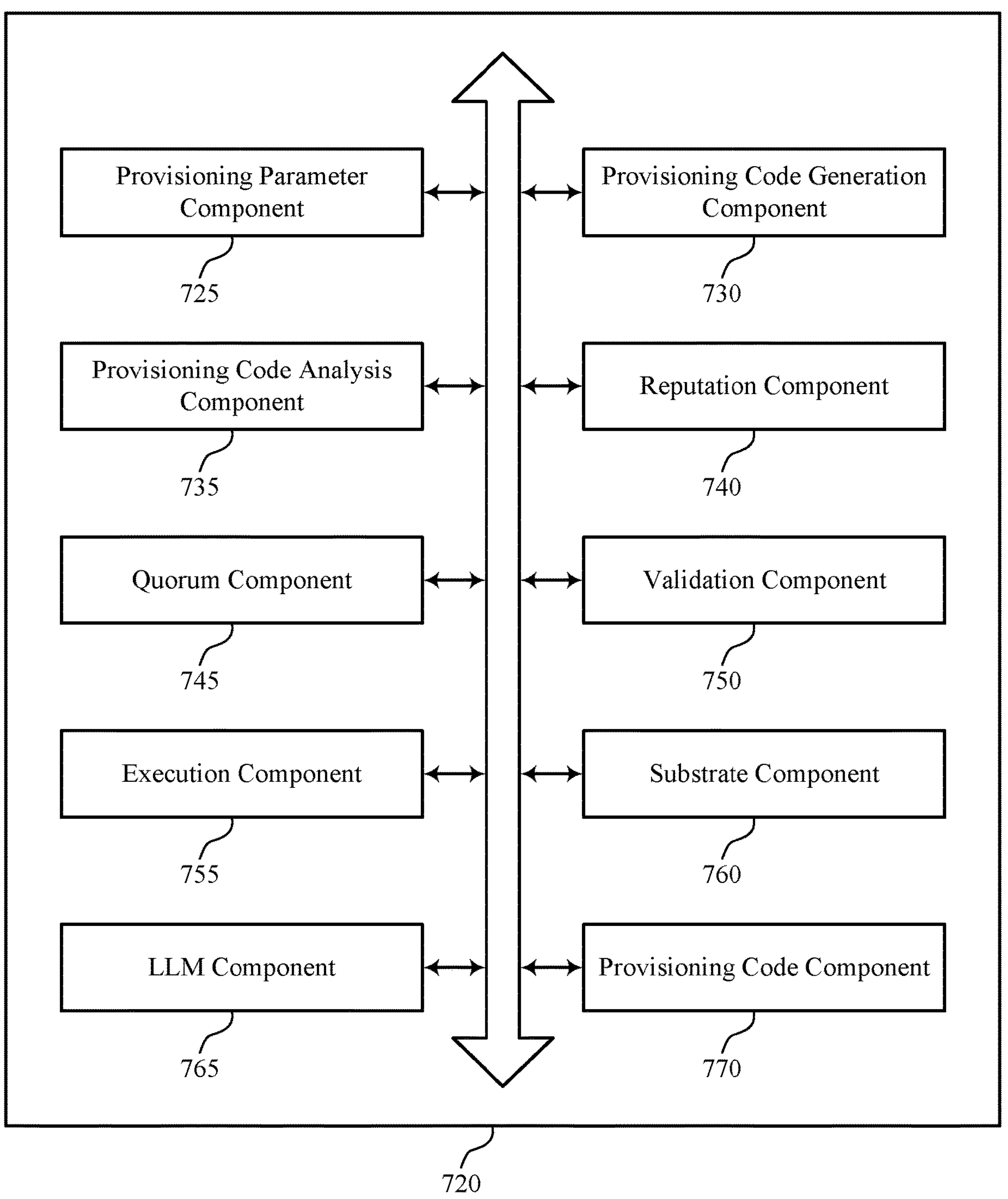
FIG. 7 shows a block diagram of a provisioning manager that supports an AI quorum for resource provisioning code generation in accordance with aspects of the present disclosure.

FIG. 7 shows a block diagram 700 of a provisioning manager 720 that supports an AI quorum for resource provisioning code generation in accordance with aspects of the present disclosure. The provisioning manager 720 may be an example of aspects of a provisioning manager or a provisioning manager 620, or both, as described herein. The provisioning manager 720, or various components thereof, may be an example of means for performing various aspects of AI quorum for resource provisioning code generation as described herein. For example, the provisioning manager 720 may include a provisioning parameter component 725, a provisioning code generation component 730, a provisioning code analysis component 735, a reputation component 740, a quorum component 745, a validation component 750, an execution component 755, a substrate component 760, an LLM component 765, a provisioning code component 770), or any combination thereof. Each of these components, or components of subcomponents thereof (e.g., one or more processors, one or more memories), may communicate, directly or indirectly, with one another (e.g., via one or more buses).

The provisioning manager 720 may support generation of cloud substrate provisioning code in accordance with examples as disclosed herein. The provisioning parameter component 725 may be configured to support receiving user input indicating a set of multiple provisioning parameters for provisioning resources on a cloud substrate. The provisioning code generation component 730 may be configured to support transmitting, to a first artificial intelligence (AI) model, the set of multiple provisioning parameters and a request to generate, based on the set of multiple provisioning parameters, provisioning code associated with the cloud substrate. The provisioning code analysis component 735 may be configured to support transmitting, to one or more second AI models, the provisioning code generated by the first AI model, the set of multiple provisioning parameters, and a request to analyze the provisioning code based on the set of multiple provisioning parameters. The reputation component 740 may be configured to support updating respective reputation values associated with the first AI model and the one or more second AI models based on one or more analysis results associated with output of the one or more second AI models.

In some examples, the one or more analysis results include a determination of a quorate state of the one or more second AI models in which a quorum of the one or more second AI models determine that the provisioning code is valid code for provisioning the resources on the cloud substrate.

In some examples, the determination of the quorate state is based on a consensus of the one or more second AI models, a quantity of the one or more second AI models that determine that the provisioning code is valid code that exceeds a threshold value, one or more weights associated with the respective reputation values of the first AI model and the one or more second AI models, or any combination thereof.

In some examples, the one or more analysis results include a code validation result, and the validation component 750 may be configured to support validating the provisioning code to generate the code validation result based on a quality analysis, a security analysis, a failure analysis, or any combination thereof.

In some examples, the one or more analysis results include a sandbox execution result, and the execution component 755 may be configured to support executing, in accordance with one or more sandbox restrictions, the provisioning code in a sandbox environment to produce the sandbox execution result, the one or more sandbox restrictions including a time frame restriction, an exit code restriction, an internet protocol (IP) address restriction, or any combination thereof.

In some examples, to support updating the respective reputation values, the reputation component 740 may be configured to support updating one or more weights for each of the first AI model and the one or more second AI models.

In some examples, the substrate component 760 may be configured to support identifying the cloud substrate based on at least one of the set of multiple provisioning parameters. In some examples, the substrate component 760 may be configured to support adding one or more identifiers associated with the cloud substrate to the set of multiple provisioning parameters.

In some examples, the set of multiple provisioning parameters includes a user identifier, a user role, a geographical region, a processing platform with which the resources on the cloud substrate are to be associated, or any combination thereof.

In some examples, the first AI model, the one or more second AI models, or any combination thereof are large language models. In some examples, the set of multiple provisioning parameters are expressed in natural language.

In some examples, the provisioning code includes one or more application programming interface (API) calls, one or more shell commands, or any combination thereof.

Figure 8:
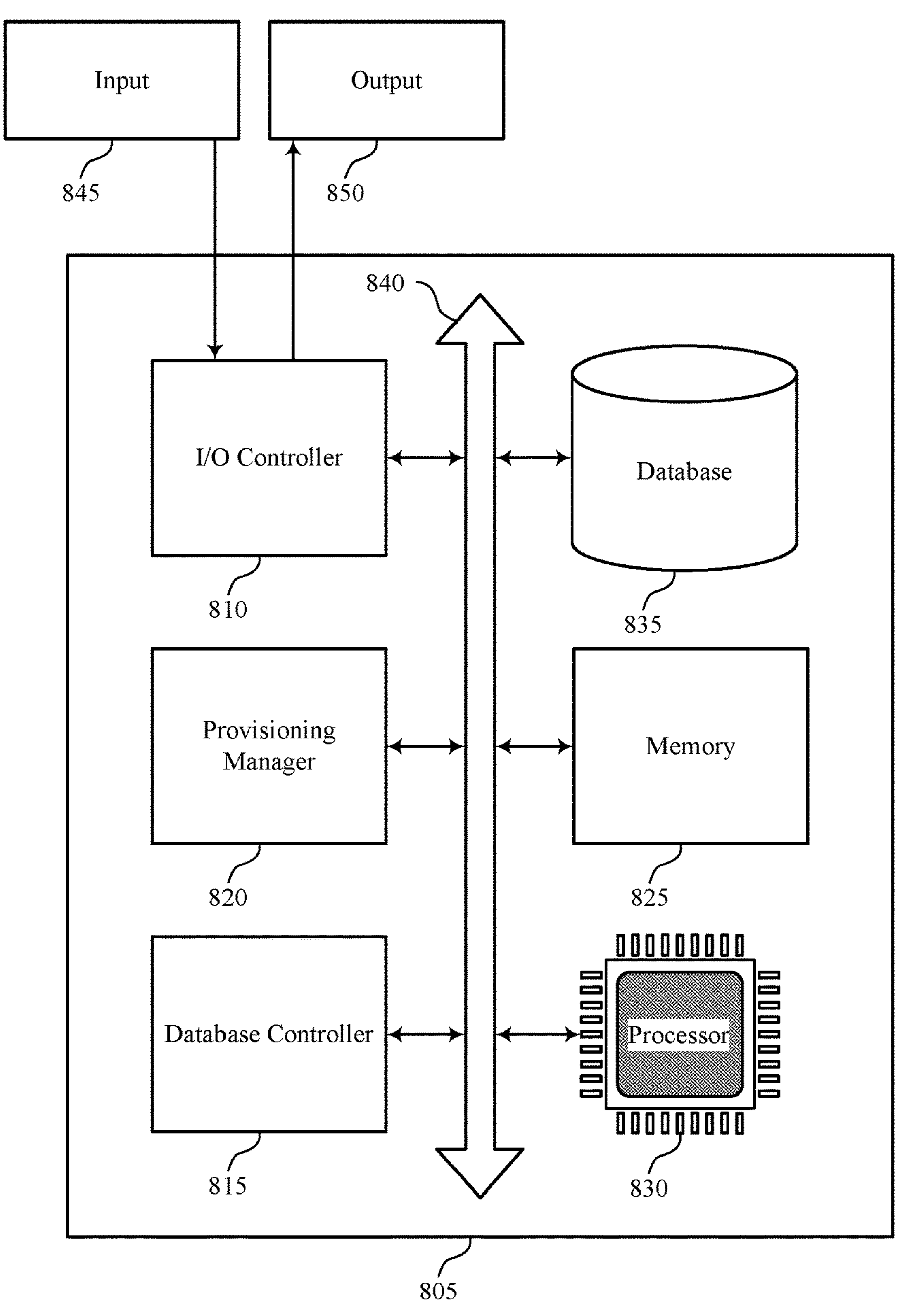
FIG. 8 shows a diagram of a system including a device that supports an AI quorum for resource provisioning code generation in accordance with aspects of the present disclosure.

FIG. 8 shows a diagram of a system 800 including a device 805 that supports an AI quorum for resource provisioning code generation in accordance with aspects of the present disclosure. The device 805 may be an example of or include the components of a device 605 as described herein. The device 805 may include components for bi-directional data communications including components for transmitting and receiving communications, such as a provisioning manager 820, an I/O controller 810, a database controller 815, at least one memory 825, at least one processor 830, and a database 835. These components may be in electronic communication or otherwise coupled (e.g., operatively, communicatively, functionally, electronically, electrically) via one or more buses (e.g., a bus 840).

The I/O controller 810 may manage input signals 845 and output signals 850 for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. In other cases, the I/O controller 810 may represent or interact with a modem, a keyboard, a mouse, a touchscreen, or a similar device. In some cases, the I/O controller 810 may be implemented as part of a processor 830. In some examples, a user may interact with the device 805 via the I/O controller 810 or via hardware components controlled by the I/O controller 810.

The database controller 815 may manage data storage and processing in a database 835. In some cases, a user may interact with the database controller 815. In other cases, the database controller 815 may operate automatically without user interaction. The database 835 may be an example of a single database, a distributed database, multiple distributed databases, a data store, a data lake, or an emergency backup database.

Memory 825 may include random-access memory (RAM) and read-only memory (ROM). The memory 825 may store computer-readable, computer-executable software including instructions that, when executed, cause at least one processor 830 to perform various functions described herein. In some cases, the memory 825 may contain, among other things, a basic I/O system (BIOS) which may control basic hardware or software operation such as the interaction with peripheral components or devices. The memory 825 may be an example of a single memory or multiple memories. For example, the device 805 may include one or more memories 825.

The processor 830 may include an intelligent hardware device (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in at least one memory 825 to perform various functions (e.g., functions or tasks supporting AI quorum for resource provisioning code generation). The processor 830 may be an example of a single processor or multiple processors. For example, the device 805 may include one or more processors 830.

The provisioning manager 820 may support generation of cloud substrate provisioning code in accordance with examples as disclosed herein. For example, the provisioning manager 820 may be configured to support receiving user input indicating a set of multiple provisioning parameters for provisioning resources on a cloud substrate. The provisioning manager 820 may be configured to support transmitting, to a first artificial intelligence (AI) model, the set of multiple provisioning parameters and a request to generate, based on the set of multiple provisioning parameters, provisioning code associated with the cloud substrate. The provisioning manager 820 may be configured to support transmitting, to one or more second AI models, the provisioning code generated by the first AI model, the set of multiple provisioning parameters, and a request to analyze the provisioning code based on the set of multiple provisioning parameters. The provisioning manager 820 may be configured to support updating respective reputation values associated with the first AI model and the one or more second AI models based on one or more analysis results associated with output of the one or more second AI models.

By including or configuring the provisioning manager 820 in accordance with examples as described herein, the device 805 may support techniques for improved communication reliability, reduced latency, improved user experience related to reduced processing, reduced power consumption, more efficient utilization of communication resources, improved coordination between devices, longer battery life, improved utilization of processing capability, or any combination thereof.

Figure 9:
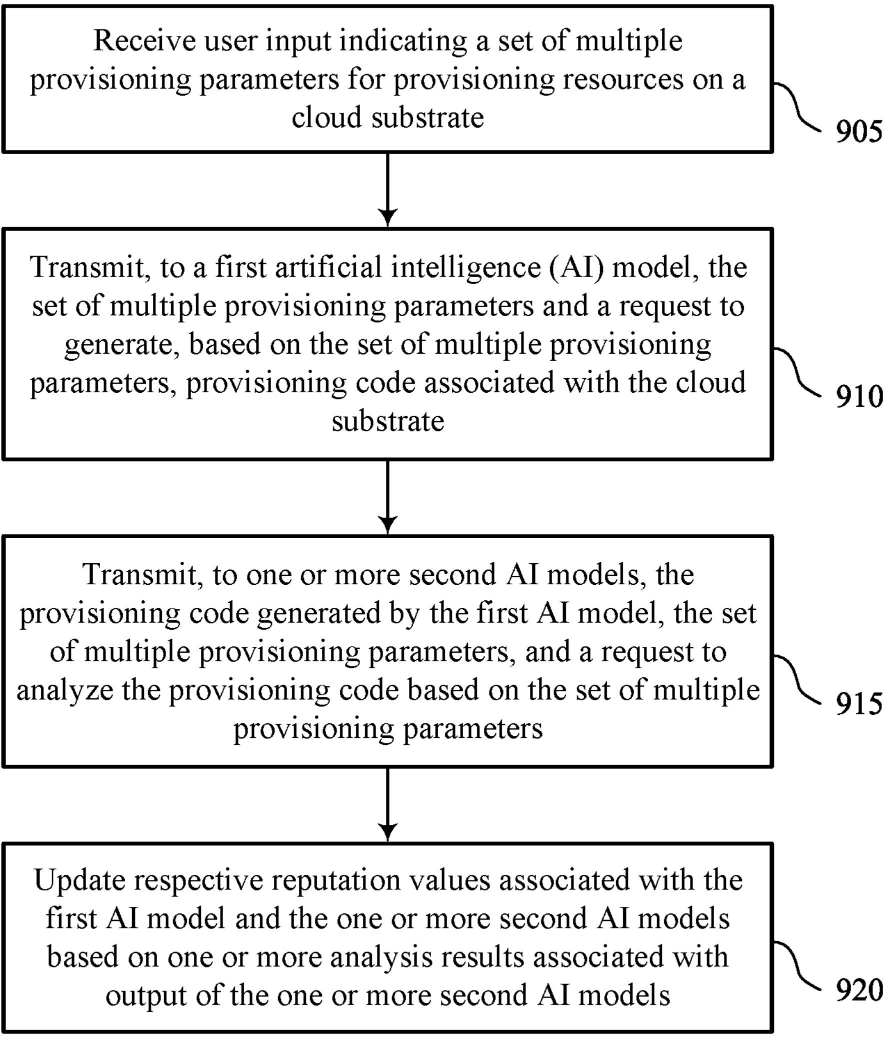
FIGS. 9 and 10 show flowcharts illustrating methods that support AI quorum for resource provisioning code generation in accordance with aspects of the present disclosure.

FIG. 9 shows a flowchart illustrating a method 900 that supports an AI quorum for resource provisioning code generation in accordance with aspects of the present disclosure. The operations of the method 900 may be implemented by an application server or its components as described herein. For example, the operations of the method 900 may be performed by an application server as described with reference to FIGS. 1 through 8. In some examples, an application server may execute a set of instructions to control the functional elements of the application server to perform the described functions. Additionally, or alternatively, the application server may perform aspects of the described functions using special-purpose hardware.

At 905, the method may include receiving user input indicating a set of multiple provisioning parameters for provisioning resources on a cloud substrate. The operations of block 905 may be performed in accordance with examples as disclosed herein. In some examples, aspects of the operations of 905 may be performed by a provisioning parameter component 725 as described with reference to FIG. 7.

At 910, the method may include transmitting, to a first artificial intelligence (AI) model, the set of multiple provisioning parameters and a request to generate, based on the set of multiple provisioning parameters, provisioning code associated with the cloud substrate. The operations of block 910 may be performed in accordance with examples as disclosed herein. In some examples, aspects of the operations of 910 may be performed by a provisioning code generation component 730 as described with reference to FIG. 7.

At 915, the method may include transmitting, to one or more second AI models, the provisioning code generated by the first AI model, the set of multiple provisioning parameters, and a request to analyze the provisioning code based on the set of multiple provisioning parameters. The operations of block 915 may be performed in accordance with examples as disclosed herein. In some examples, aspects of the operations of 915 may be performed by a provisioning code analysis component 735 as described with reference to FIG. 7.

At 920, the method may include updating respective reputation values associated with the first AI model and the one or more second AI models based on one or more analysis results associated with output of the one or more second AI models. The operations of block 920 may be performed in accordance with examples as disclosed herein.

In some examples, aspects of the operations of 920 may be performed by a reputation component 740 as described with reference to FIG. 7.

Figure 10:
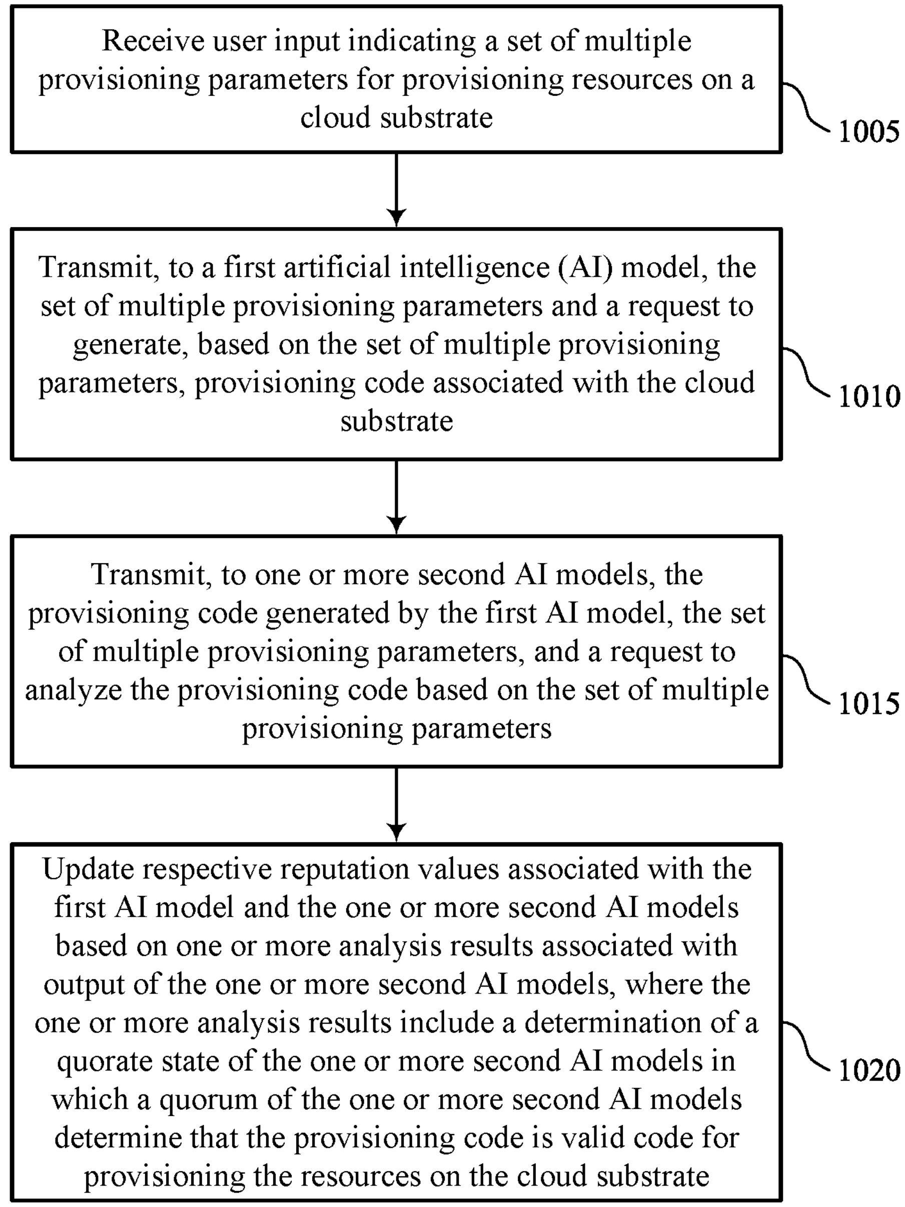

FIG. 10 shows a flowchart illustrating a method 1000 that supports an AI quorum for resource provisioning code generation in accordance with aspects of the present disclosure. The operations of the method 1000 may be implemented by an application server or its components as described herein. For example, the operations of the method 1000 may be performed by an application server as described with reference to FIGS. 1 through 8. In some examples, an application server may execute a set of instructions to control the functional elements of the application server to perform the described functions. Additionally, or alternatively, the application server may perform aspects of the described functions using special-purpose hardware.

At 1005, the method may include receiving user input indicating a set of multiple provisioning parameters for provisioning resources on a cloud substrate. The operations of block 1005 may be performed in accordance with examples as disclosed herein. In some examples, aspects of the operations of 1005 may be performed by a provisioning parameter component 725 as described with reference to FIG. 7.

At 1010, the method may include transmitting, to a first artificial intelligence (AI) model, the set of multiple provisioning parameters and a request to generate, based on the set of multiple provisioning parameters, provisioning code associated with the cloud substrate. The operations of block 1010 may be performed in accordance with examples as disclosed herein. In some examples, aspects of the operations of 1010 may be performed by a provisioning code generation component 730 as described with reference to FIG. 7.

At 1015, the method may include transmitting, to one or more second AI models, the provisioning code generated by the first AI model, the set of multiple provisioning parameters, and a request to analyze the provisioning code based on the set of multiple provisioning parameters. The operations of block 1015 may be performed in accordance with examples as disclosed herein. In some examples, aspects of the operations of 1015 may be performed by a provisioning code analysis component 735 as described with reference to FIG. 7.

At 1020, the method may include updating respective reputation values associated with the first AI model and the one or more second AI models based on one or more analysis results associated with output of the one or more second AI models, where the one or more analysis results including a determination of a quorate state of the one or more second AI models in which a quorum of the one or more second AI models determine that the provisioning code is valid code for provisioning the resources on the cloud substrate. The operations of block 1020 may be performed in accordance with examples as disclosed herein. In some examples, aspects of the operations of 1020 may be performed by a reputation component 740 as described with reference to FIG. 7. In some examples, aspects of the operations of 1025 may be performed by a quorum component 745 as described with reference to FIG. 7.

A method for generation of cloud substrate provisioning code by an apparatus is described. The method may include receiving user input indicating a set of multiple provisioning parameters for provisioning resources on a cloud substrate, transmitting, to a first artificial intelligence (AI) model, the set of multiple provisioning parameters and a request to generate, based on the set of multiple provisioning parameters, provisioning code associated with the cloud substrate, transmitting, to one or more second AI models, the provisioning code generated by the first AI model, the set of multiple provisioning parameters, and a request to analyze the provisioning code based on the set of multiple provisioning parameters, and updating respective reputation values associated with the first AI model and the one or more second AI models based on one or more analysis results associated with output of the one or more second AI models.

An apparatus for generation of cloud substrate provisioning code is described. The apparatus may include one or more memories storing processor executable code, and one or more processors coupled with the one or more memories. The one or more processors may individually or collectively operable to execute the code to cause the apparatus to receive user input indicating a set of multiple provisioning parameters for provisioning resources on a cloud substrate, transmit, to a first artificial intelligence (AI) model, the set of multiple provisioning parameters and a request to generate, based on the set of multiple provisioning parameters, provisioning code associated with the cloud substrate, transmit, to one or more second AI models, the provisioning code generated by the first AI model, the set of multiple provisioning parameters, and a request to analyze the provisioning code based on the set of multiple provisioning parameters, and update respective reputation values associated with the first AI model and the one or more second AI models based on one or more analysis results associated with output of the one or more second AI models.

Another apparatus for generation of cloud substrate provisioning code is described. The apparatus may include means for receiving user input indicating a set of multiple provisioning parameters for provisioning resources on a cloud substrate, means for transmitting, to a first artificial intelligence (AI) model, the set of multiple provisioning parameters and a request to generate, based on the set of multiple provisioning parameters, provisioning code associated with the cloud substrate, means for transmitting, to one or more second AI models, the provisioning code generated by the first AI model, the set of multiple provisioning parameters, and a request to analyze the provisioning code based on the set of multiple provisioning parameters, and means for updating respective reputation values associated with the first AI model and the one or more second AI models based on one or more analysis results associated with output of the one or more second AI models.

A non-transitory computer-readable medium storing code for generation of cloud substrate provisioning code is described. The code may include instructions executable by one or more processors to receive user input indicating a set of multiple provisioning parameters for provisioning resources on a cloud substrate, transmit, to a first artificial intelligence (AI) model, the set of multiple provisioning parameters and a request to generate, based on the set of multiple provisioning parameters, provisioning code associated with the cloud substrate, transmit, to one or more second AI models, the provisioning code generated by the first AI model, the set of multiple provisioning parameters, and a request to analyze the provisioning code based on the set of multiple provisioning parameters, and update respective reputation values associated with the first AI model and the one or more second AI models based on one or more analysis results associated with output of the one or more second AI models.

In some examples of the method, apparatus, and non-transitory computer-readable medium described herein, the one or more analysis results include a determination of a quorate state of the one or more second AI models in which a quorum of the one or more second AI models determine that the provisioning code may be valid code for provisioning the resources on the cloud substrate.

In some examples of the method, apparatus, and non-transitory computer-readable medium described herein, the determination of the quorate state may be based on a consensus of the one or more second AI models, a quantity of the one or more second AI models that determine that the provisioning code may be valid code that exceeds a threshold value, one or more weights associated with the respective reputation values of the first AI model and the one or more second AI models, or any combination thereof.

In some examples of the method, apparatus, and non-transitory computer-readable medium described herein, the one or more analysis results include a code validation result and the method, apparatuses, and non-transitory computer-readable medium may include further operations, features, means, or instructions for validating the provisioning code to generate the code validation result based on a quality analysis, a security analysis, a failure analysis, or any combination thereof.

In some examples of the method, apparatus, and non-transitory computer-readable medium described herein, the one or more analysis results include a sandbox execution result and the method, apparatuses, and non-transitory computer-readable medium may include further operations, features, means, or instructions for executing, in accordance with one or more sandbox restrictions, the provisioning code in a sandbox environment to produce the sandbox execution result, the one or more sandbox restrictions including a time frame restriction, an exit code restriction, an internet protocol (IP) address restriction, or any combination thereof.

In some examples of the method, apparatus, and non-transitory computer-readable medium described herein, updating the respective reputation values may include operations, features, means, or instructions for updating one or more weights for each of the first AI model and the one or more second AI models.

Some examples of the method, apparatus, and non-transitory computer-readable medium described herein may further include operations, features, means, or instructions for identifying the cloud substrate based on at least one of the set of multiple provisioning parameters and adding one or more identifiers associated with the cloud substrate to the set of multiple provisioning parameters.

In some examples of the method, apparatus, and non-transitory computer-readable medium described herein, the set of multiple provisioning parameters includes a user identifier, a user role, a geographical region, a processing platform with which the resources on the cloud substrate may be associated, or any combination thereof.

In some examples of the method, apparatus, and non-transitory computer-readable medium described herein, the first AI model, the one or more second AI models, or any combination thereof may be large language models and the set of multiple provisioning parameters may be expressed in natural language.

In some examples of the method, apparatus, and non-transitory computer-readable medium described herein, the provisioning code includes one or more application programming interface (API) calls, one or more shell commands, or any combination thereof.

The following provides an overview of aspects of the present disclosure:

Aspect 1: A method for generation of cloud substrate provisioning code, comprising: receiving user input indicating a plurality of provisioning parameters for provisioning resources on a cloud substrate: transmitting, to a first artificial intelligence (AI) model, the plurality of provisioning parameters and a request to generate, based at least in part on the plurality of provisioning parameters, provisioning code associated with the cloud substrate: transmitting, to one or more second AI models, the provisioning code generated by the first AI model, the plurality of provisioning parameters, and a request to analyze the provisioning code based at least in part on the plurality of provisioning parameters; and updating respective reputation values associated with the first AI model and the one or more second AI models based at least in part on one or more analysis results associated with output of the one or more second AI models.

Aspect 2: The method of aspect 1, wherein the one or more analysis results comprise a determination of a quorate state of the one or more second AI models in which a quorum of the one or more second AI models determine that the provisioning code is valid code for provisioning the resources on the cloud substrate.

Aspect 3: The method of aspect 2, wherein the determination of the quorate state is based at least in part on a consensus of the one or more second AI models, a quantity of the one or more second AI models that determine that the provisioning code is valid code that exceeds a threshold value, one or more weights associated with the respective reputation values of the first AI model and the one or more second AI models, or any combination thereof.

Aspect 4: The method of any of aspects 1 through 3, wherein the one or more analysis results comprise a code validation result, the method further comprising: validating the provisioning code to generate the code validation result based at least in part on a quality analysis, a security analysis, a failure analysis, or any combination thereof.

Aspect 5: The method of any of aspects 1 through 4, wherein the one or more analysis results comprise a sandbox execution result, the method further comprising: executing, in accordance with one or more sandbox restrictions, the provisioning code in a sandbox environment to produce the sandbox execution result, the one or more sandbox restrictions comprising a time frame restriction, an exit code restriction, an internet protocol (IP) address restriction, or any combination thereof.

Aspect 6: The method of any of aspects 1 through 5, wherein updating the respective reputation values comprises: updating one or more weights for each of the first AI model and the one or more second AI models.

Aspect 7: The method of any of aspects 1 through 6, further comprising: identifying the cloud substrate based at least in part on at least one of the plurality of provisioning parameters; and adding one or more identifiers associated with the cloud substrate to the plurality of provisioning parameters.

Aspect 8: The method of any of aspects 1 through 7, wherein the plurality of provisioning parameters comprises a user identifier, a user role, a geographical region, a processing platform with which the resources on the cloud substrate are to be associated, or any combination thereof.

Aspect 9: The method of any of aspects 1 through 8, wherein the first AI model, the one or more second AI models, or any combination thereof are large language models; and the plurality of provisioning parameters are expressed in natural language.

Aspect 10: The method of any of aspects 1 through 9, wherein the provisioning code comprises one or more application programming interface (API) calls, one or more shell commands, or any combination thereof.

Aspect 11: An apparatus for generation of cloud substrate provisioning code, comprising one or more memories storing processor-executable code, and one or more processors coupled with the one or more memories and individually or collectively operable to execute the code to cause the apparatus to perform a method of any of aspects 1 through 10.

Aspect 12: An apparatus for generation of cloud substrate provisioning code, comprising at least one means for performing a method of any of aspects 1 through 10.

Aspect 13: A non-transitory computer-readable medium storing code for generation of cloud substrate provisioning code, the code comprising instructions executable by one or more processors to perform a method of any of aspects 1 through 10.

It should be noted that the methods described herein describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article “a” may be understood to mean “one or more components,” and referring to “the component” subsequently in the claims may be understood to be equivalent to referring to “at least one of the one or more components.” Similarly, subsequent reference to a component introduced as “one or more components” using the terms “the” or “said” may refer to any or all of the one or more components. For example, referring to “the one or more components” subsequently in the claims may be understood to be equivalent to referring to “at least one of the one or more components.”

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for generation of cloud substrate provisioning code, comprising:

receiving user input indicating a plurality of provisioning parameters for provisioning resources on a cloud substrate:

transmitting, to a first artificial intelligence (AI) model, the plurality of provisioning parameters and a request to generate, based at least in part on the plurality of provisioning parameters, provisioning code associated with the cloud substrate;

transmitting, to one or more second AI models, the provisioning code generated by the first AI model, the plurality of provisioning parameters, and a request to analyze the provisioning code based at least in part on the plurality of provisioning parameters; and updating respective reputation values associated with the first AI model and the one or more second AI models based at least in part on one or more analysis results associated with output of the one or more second AI models.

2. The method of claim 1, wherein the one or more analysis results comprise a determination of a quorate state of the one or more second AI models in which a quorum of the one or more second AI models determine that the provisioning code is valid code for provisioning the resources on the cloud substrate.

3. The method of claim 2, wherein the determination of the quorate state is based at least in part on a consensus of the one or more second AI models, a quantity of the one or more second AI models that determine that the provisioning code is valid code that exceeds a threshold value, one or more weights associated with the respective reputation values of the first AI model and the one or more second AI models, or any combination thereof.

4. The method of claim 1, wherein the one or more analysis results comprise a code validation result, the method further comprising:

validating the provisioning code to generate the code validation result based at least in part on a quality analysis, a security analysis, a failure analysis, or any combination thereof.

5. The method of claim 1, wherein the one or more analysis results comprise a sandbox execution result, the method further comprising:

executing, in accordance with one or more sandbox restrictions, the provisioning code in a sandbox environment to produce the sandbox execution result, the one or more sandbox restrictions comprising a time frame restriction, an exit code restriction, an internet protocol (IP) address restriction, or any combination thereof.

6. The method of claim 1, wherein updating the respective reputation values comprises:

updating one or more weights for each of the first AI model and the one or more second AI models.

7. The method of claim 1, further comprising:

identifying the cloud substrate based at least in part on at least one of the plurality of provisioning parameters; and adding one or more identifiers associated with the cloud substrate to the plurality of provisioning parameters.

8. The method of claim 1, wherein the plurality of provisioning parameters comprises a user identifier, a user role, a geographical region, a processing platform with which the resources on the cloud substrate are to be associated, or any combination thereof.

9. The method of claim 1, wherein:

the first AI model, the one or more second AI models, or any combination thereof are large language models; and the plurality of provisioning parameters are expressed in natural language.

10. The method of claim 1, wherein the provisioning code comprises one or more application programming interface (API) calls, one or more shell commands, or any combination thereof.

11. An apparatus for generation of cloud substrate provisioning code, comprising:

one or more memories storing processor-executable code; and one or more processors coupled with the one or more memories and individually or collectively operable to execute the code to cause the apparatus to:

receive user input indicating a plurality of provisioning parameters for provisioning resources on a cloud substrate;

transmit, to a first artificial intelligence (AI) model, the plurality of provisioning parameters and a request to generate, based at least in part on the plurality of provisioning parameters, provisioning code associated with the cloud substrate;

transmit, to one or more second AI models, the provisioning code generated by the first AI model, the plurality of provisioning parameters, and a request to analyze the provisioning code based at least in part on the plurality of provisioning parameters; and update respective reputation values associated with the first AI model and the one or more second AI models based at least in part on one or more analysis results associated with output of the one or more second AI models.

12. The apparatus of claim 11, wherein the one or more analysis results comprise a determination of a quorate state of the one or more second AI models in which a quorum of the one or more second AI models determine that the provisioning code is valid code for provisioning the resources on the cloud substrate.

13. The apparatus of claim 12, wherein the determination of the quorate state is based at least in part on a consensus of the one or more second AI models, a quantity of the one or more second AI models that determine that the provisioning code is valid code that exceeds a threshold value, one or more weights associated with the respective reputation values of the first AI model and the one or more second AI models, or any combination thereof.

14. The apparatus of claim 11, wherein the one or more analysis results comprise a code validation result, and the one or more processors are individually or collectively further operable to execute the code to cause the apparatus to:

validate the provisioning code to generate the code validation result based at least in part on a quality analysis, a security analysis, a failure analysis, or any combination thereof.

15. The apparatus of claim 11, wherein the one or more analysis results comprise a sandbox execution result, and the one or more processors are individually or collectively further operable to execute the code to cause the apparatus to:

execute, in accordance with one or more sandbox restrictions, the provisioning code in a sandbox environment to produce the sandbox execution result, the one or more sandbox restrictions comprising a time frame restriction, an exit code restriction, an internet protocol (IP) address restriction, or any combination thereof.

16. The apparatus of claim 11, wherein, to update the respective reputation values, the one or more processors are individually or collectively operable to execute the code to cause the apparatus to:

update one or more weights for each of the first AI model and the one or more second AI models.

17. The apparatus of claim 11, wherein the one or more processors are individually or collectively further operable to execute the code to cause the apparatus to:

identify the cloud substrate based at least in part on at least one of the plurality of provisioning parameters; and add one or more identifiers associated with the cloud substrate to the plurality of provisioning parameters.

18. The apparatus of claim 11, wherein the plurality of provisioning parameters comprises a user identifier, a user role, a geographical region, a processing platform with which the resources on the cloud substrate are to be associated, or any combination thereof.

19. The apparatus of claim 11, wherein:

the first AI model, the one or more second AI models, or any combination thereof are large language models; and the plurality of provisioning parameters are expressed in natural language.

20. A non-transitory computer-readable medium storing code for generation of cloud substrate provisioning code, the code comprising instructions executable by one or more processors to:

receive user input indicating a plurality of provisioning parameters for provisioning resources on a cloud substrate;

transmit, to a first artificial intelligence (AI) model, the plurality of provisioning parameters and a request to generate, based at least in part on the plurality of provisioning parameters, provisioning code associated with the cloud substrate;

transmit, to one or more second AI models, the provisioning code generated by the first AI model, the plurality of provisioning parameters, and a request to analyze the provisioning code based at least in part on the plurality of provisioning parameters; and update respective reputation values associated with the first AI model and the one or more second AI models based at least in part on one or more analysis results associated with output of the one or more second AI models.

* * * * *